(12) United States Patent
Hsieh

(10) Patent No.: US 7,864,430 B2
(45) Date of Patent: Jan. 4, 2011

(54) MODIFIED MICHELSON DELAY LINE INTERFEROMETER

(75) Inventor: Yung-Chieh Hsieh, San Jose', CA (US)

(73) Assignee: Optoplex Corporation, Fremont, CA (US)

(*) Notice: Subject to any disclaimer, the term of this patent is extended or adjusted under 35 U.S.C. 154(b) by 201 days.

(21) Appl. No.: 12/174,628

(22) Filed: Jul. 16, 2008

(65) Prior Publication Data

US 2009/0135473 A1    May 28, 2009

Related U.S. Application Data

(63) Continuation-in-part of application No. 11/485,653, filed on Jul. 11, 2006, now Pat. No. 7,522,343, which is a continuation-in-part of application No. 11/360,959, filed on Feb. 22, 2006.

(60) Provisional application No. 60/950,142, filed on Jul. 17, 2007.

(51) Int. Cl.
G02B 27/14    (2006.01)
H04B 10/06    (2006.01)

(52) U.S. Cl. ........................ 359/629; 398/202
(58) Field of Classification Search ............ 359/618, 359/629, 636, 639; 398/202
See application file for complete search history.

(56) References Cited

U.S. PATENT DOCUMENTS

2008/0240736 A1* 10/2008 Ji et al. .................. 398/202

* cited by examiner

*Primary Examiner*—William C Choi
(74) *Attorney, Agent, or Firm*—Antonio R. Durando; John P. Wooldridge

(57) ABSTRACT

In an optical etalon with a fixed FSR determined by the cavity length, the time delay is adjusted by an etalon surface coating. The proper cavity length is chosen to achieve a desired FSR, and the coating is independently selected to obtain a desired time delay.

8 Claims, 27 Drawing Sheets

MODIFIED MICHELSON DELAY LINE INTERFEROMETER

This application claims priority to U.S. Provisional Patent Application Ser. No. 60/950,142, titled: "Modified Michelson Delay Line Interferometer" filed Jul. 17, 2007 and incorporated herein by reference. This is a continuation-in-part of U.S. patent application Ser. No. 11/485,653, titled: "Integration of Michelson Differential Phase Shift Keying (DPSK) Demodulator with Photo Detector," filed Jul. 11, 2006, now U.S. Pat. No. 7,522,343 incorporated herein by reference, which is a continuation-in-part of U.S. patent application Ser. No. 11/360,959, titled: "Michelson Interferometer Based Delay Line Interferometers," filed Feb. 22, 2006, incorporated herein by reference.

BACKGROUND OF THE INVENTION

1. Field of the Invention

The present invention relates to differential phase-shift keying (DPSK) in telecommunication, and more specifically, it relates to methods in DPSK for converting a phase-keyed signal to an intensity-keyed signal.

2. Description of Related Art

Phase-shift keying (PSK) is a digital modulation scheme that conveys data by changing, or modulating, the phase of a reference signal (the carrier wave). Any digital modulation scheme uses a finite number of distinct signals to represent digital data. In the case of PSK, a finite number of phases are used. Each of these phases is assigned a unique pattern of binary bits. Usually, each phase encodes an equal number of bits. Each pattern of bits forms the symbol that is represented by the particular phase. The demodulator, which is designed specifically for the symbol-set used by the modulator, determines the phase of the received signal and maps it back to the symbol it represents, thus recovering the original data. This requires the receiver to be able to compare the phase of the received signal to a reference signal—such a system is termed coherent.

Alternatively, instead of using the bit patterns to set the phase of the wave, it can instead be used to change it by a specified amount. The demodulator then determines the changes in the phase of the received signal rather than the phase itself. Since this scheme depends on the difference between successive phases, it is termed differential phase-shift keying (DPSK). DPSK can be significantly simpler to implement than ordinary PSK since there is no need for the demodulator to have a copy of the reference signal to determine the exact phase of the received signal (it is a non-coherent scheme).

In telecommunication technology, differential phase-shift keying (DPSK) requires a decoding method in order to convert the phase-keyed signal to an intensity-keyed signal at the receiving end. The decoding method can be achieved by comparing the phase of two sequential bits. In principle, it splits the input signal beam into two channels with a small delay before recombining them. After the recombination, the beams from the two channels interfere constructively or destructively. The interference intensity is measured and becomes the intensity-keyed signal. To achieve this, one channel has an optical path longer than the other one by a distance equivalent to the photon flight time of one bit. For instance, in a 40 Gbit per second system, one bit is equal to 25 ps, and light travels 7.5 mm in that period. In this example; the optical path difference (OPD) between the two channels is 7.5 mm.

SUMMARY OF THE INVENTION

It is an object of the present invention to provide a DPSK demodulator with a desired time delay between the two interference arms using at least one etalon in a DLI.

Another object is to provide a DPSK demodulator with a desired time delay between the two interference arms using one etalon in each arm of a DLI.

Another object is to provide a DPSK demodulator with a desired time delay between the two interference arms using two etalons with the same FSR.

Another object is to provide a DPSK demodulator with a desired time delay between the two interference arms using two etalons with the same FSR, which is equal to ITU frequency spacing.

Another object is to provide the desired time delay, which is almost constant within the pass band of the channel.

These and other objects will be apparent based on the disclosure herein.

An optical etalon with a fixed FSR, determined by the cavity length, the time delay can be adjusted by the coating. The proper cavity length can therefore be chosen to achieve a desired FSR, and the coating can be independently selected to obtain a desired time delay.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Michelson DPSK Demodulator

Figure 1:
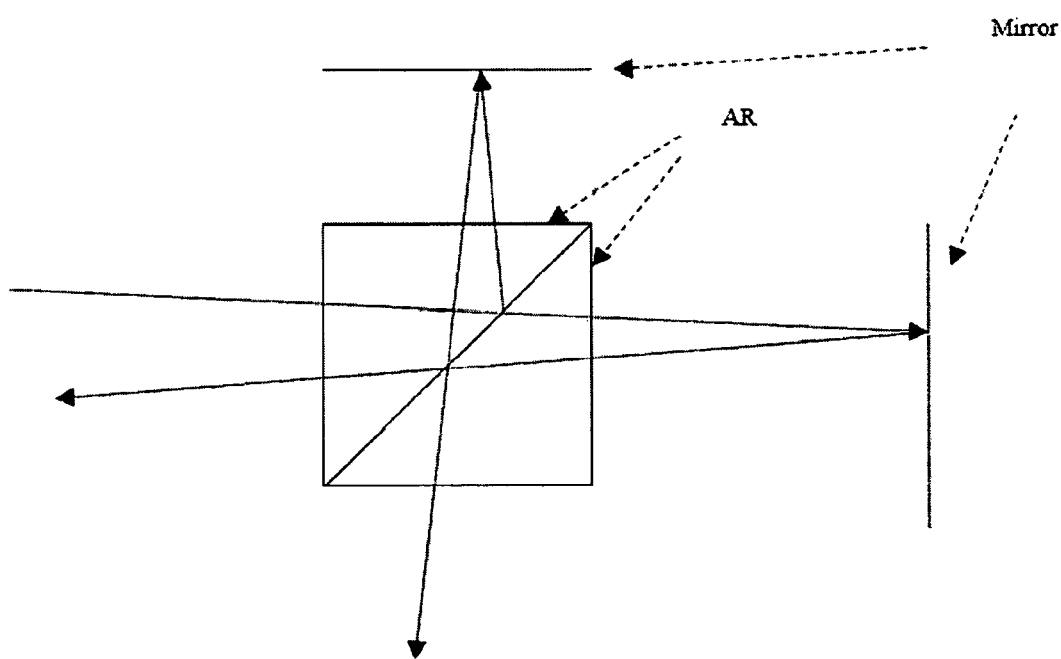
FIG. 1 shows a Michelson DLI

The delay line interferometer is a key component in optical communication for demodulating the phase modulated optical signal. FIG. 1 shows a typical implementation using a Michelson interferometer. Input light beam 10 passes through the entrance face 12 of beam splitter 14 and beam 10 is split at interface 16 into beams 18 and 20. Beam 18 travels upward in the figure, passing through face 22 and then is reflected by mirror 24 such that it passes back through face 22 and is split at interface 16 into beams 18' and 18". In similar manner, beam 20 travels to the right in the figure, passing through face 26 and then is reflected by mirror 28 such that it passes back through face 26 and is again split at interface 16 into beams 20' and 20". Note that faces 22 and 26 are antireflection coated. The two mirrors are set at different distances from beam splitter 14. The beam 18' and 20' are collinear in the beam travelling toward the left side of the figure and beams 18" and 20" are collinear in the beam traveling downward in the figure. Because the two mirrors are set at different distances from the beam splitter, there is a time delay between beams 18' and 20' and a time delay between beams 18" and 20". The time delay is due to the path length difference.

The path length difference, referred to in the following formulas as $L_1 - L_2$, corresponds to the time delay required.

$$\phi_1 = 2\pi\left(\frac{v}{v_1}\right)$$

$$\phi_2 = 2\pi\left(\frac{v}{v_2}\right)$$

where $$v_1 = \frac{C}{2L_1}$$

$$v_2 = \frac{C}{2L_2}$$

C: Speed of light time delay $$\tau = \tau_1 - \tau_2 = 2\left(\frac{L_1 - L_2}{C}\right)$$

The power spectrums of the transfer function for the constructive and destructive ports are as follows.

$$P_{constr} = \cos^2\left(\frac{\phi_1 - \phi_2}{2}\right) = \cos^2\left(\pi\frac{v}{v_\tau}\right) \quad \text{Equation (1)}$$

$$P_{destr} = \sin^2\left(\frac{\phi_1 - \phi_2}{2}\right) = \sin^2\left(\pi\frac{v}{v_\tau}\right)$$

$$v_\tau = \frac{1}{\tau} = FSR$$

The 3 dB bandwidth of the transfer function is $$FWHM = \frac{v_\tau}{2} = \frac{FSR}{2} \quad \text{Equation (2)}$$

Equation (1) shows that the FSR (free spectral range) of the transfer function is the inverse of the time delay between the two interference arms. This is the fundamental property of the regular delay line interferometer (DLI). In such a device, the time delay and the FSR are not independent parameters. Once the time delay is chosen, the FSR is determined.

TABLE 1

Summary of the Michelson interferometer DPSK demodulator:

| | Time delay | FSR | FWHM | Delay ripple |
|---|---|---|---|---|
| Michelson interferometer | $\tau$ | $\frac{1}{\tau}$ | $\frac{1}{2\tau}$ | 0 |

Therefore, to obtain a wider FWHM, a smaller time delay is require. It has been shown both theoretically and experimentally, to demodulate a 42.8 Gbit/sec of DPSK phase signal, the optimized time delay is about 15 ps rather than 23.3 ps (which corresponds to a 1 bit delay). This is the result of the balance between the overlapping of two adjacent pulses in the time domain and the phase match in the frequency domain. If exactly a one-bit delay is desired, the FSR should be 42.8 GHz. In such case, the two adjacent bits in the time domain will overlap very well. However, only the carrier frequency has 0 degree of phase error. Once the frequency is off from the carrier, the phase will not match perfectly. In contrast, if the time delay is 15 ps, a certain percentage of the pulse in the time domain will not overlap and frequency components off from the carrier frequency will also have phase mis-match. However, since the phase mis-match slope is smaller, the mis-match penalty will also be smaller.

For a 15 ps time delay, the corresponding FSR is equal to 66.67 GHz. Since the FSR is not equal to 50 GHz or 100 GHz, which are typical channel spacing in communication channels, the peak of the transfer function do not correspond to the International Telecommunication Union (ITU) grids. This makes it very inconvenient in real application.

The invention provides apparatuses and methods to keep the time delay as required but with all the ITU frequencies on the peak of transfer function.

Etalon Time Constant, Time Delay and Resonance Fundamental Frequency

For a given optical etalon with optical path length between the two reflection surfaces, $L_E$, we have, $$\tau_E = \frac{2L_E}{C},$$

Etalon time constant $$v_E = FSR = \frac{1}{\tau_E},$$

Etalon resonance fundamental frequency

Etalon Time Delay

Using the first surface of the etalon as the reference surface, if the phase of the reflection beam is written as $\phi_o(v)$.

For any optical device, if the phase of the transfer function is $\phi_o(\upsilon)$, the time delay is $$t_E = \frac{1}{2\pi}\frac{d\phi_o}{d\nu}$$

Time Delay for Gires-Tournois (GT) Etalon

For a GT etalon, $$\phi_{GT} = 2\tan^{-1}\left(\alpha\tan\left(\frac{\pi\nu}{\nu_E}\right)\right)$$

$$\alpha = \left(\frac{1-r}{1+r}\right), \ 0 < \alpha < 1$$

$$r = \sqrt{R}$$

R: reflectivity of the front surface (PR coating)

When the optical frequency, v, is near the multiple integers of the resonance frequency, then $$\phi_{GT} = 2\alpha\pi\frac{\nu}{\nu_E} \quad \text{Equation (3)}$$

$$t_{GT} = \alpha\tau_E = \frac{2\alpha L_E}{C}$$

TABLE 2

The time delay of a GT etalon for a few different reflectivities

|  | R = 0 | R = 1/9 | R = 1 |
|---|---|---|---|
| r | 0 | 1/3 | 1 |
| α | 1 | 0.5 | 0 |
| Time delay ($t_{GT}$) | $t_E$ | $0.5 t_E$ | 0 |

Equation (3) shows that the time delay of an etalon can be a fraction of the cavity time constant and the amount of delay can be adjusted by the reflectivity of the PR coating. In other words, for an optical etalon with a fixed FSR, which corresponds to its fundamental resonance frequency, the time delay can be adjusted by the coating. This invention will use this property to build a DPSK demodulator with required time delay between the two interference arms, but the FSR is equal to ITU frequency spacing.

Modified Michelson DLI (Delay Line Interferometer)

The present invention adjusts the time delay and FSR independently. The method is called MM-DLI (modified Michelson delay-line interferometer).

Combining Eq. (2) and (3), we have, $$FWHM = \frac{1}{2t_{GT}} = \frac{1}{2\alpha}\nu_E = \frac{1}{2\alpha}FSR \quad \text{Equation (4)}$$

Equation (4) indicates that for a given FSR, one can change the coating to achieve the required bandwidth.

TABLE 3

Terminology

| | |
|---|---|
| GT | GT etalon with 100 GHz FSR (~1.5 mm) |
| 2GT | GT etalon with 50 GHz FSR (~3 mm) |
| AP | 1.5 mm space formed by an AR (anti-reflected surface) and PR (partially reflecting coating surface) |
| 2AP | a 3 mm space formed by an AR (anti-reflected surface) and PR (partial reflected coating surface) |
| mirror | The ~100% reflection surface |

FIG. 3 to FIG. 17 show exemplary MM-DLI designs and the corresponding power spectrums and time delay curves. In those examples, the etalons are either 100 GHz or 50 GHz. In general, the FSR of the etalons can be any number. U.S. Pat. No. 6,587,204 is incorporated herein by reference. U.S. Pat. No. 7,145,727 is incorporated herein by reference.

Figure 2:
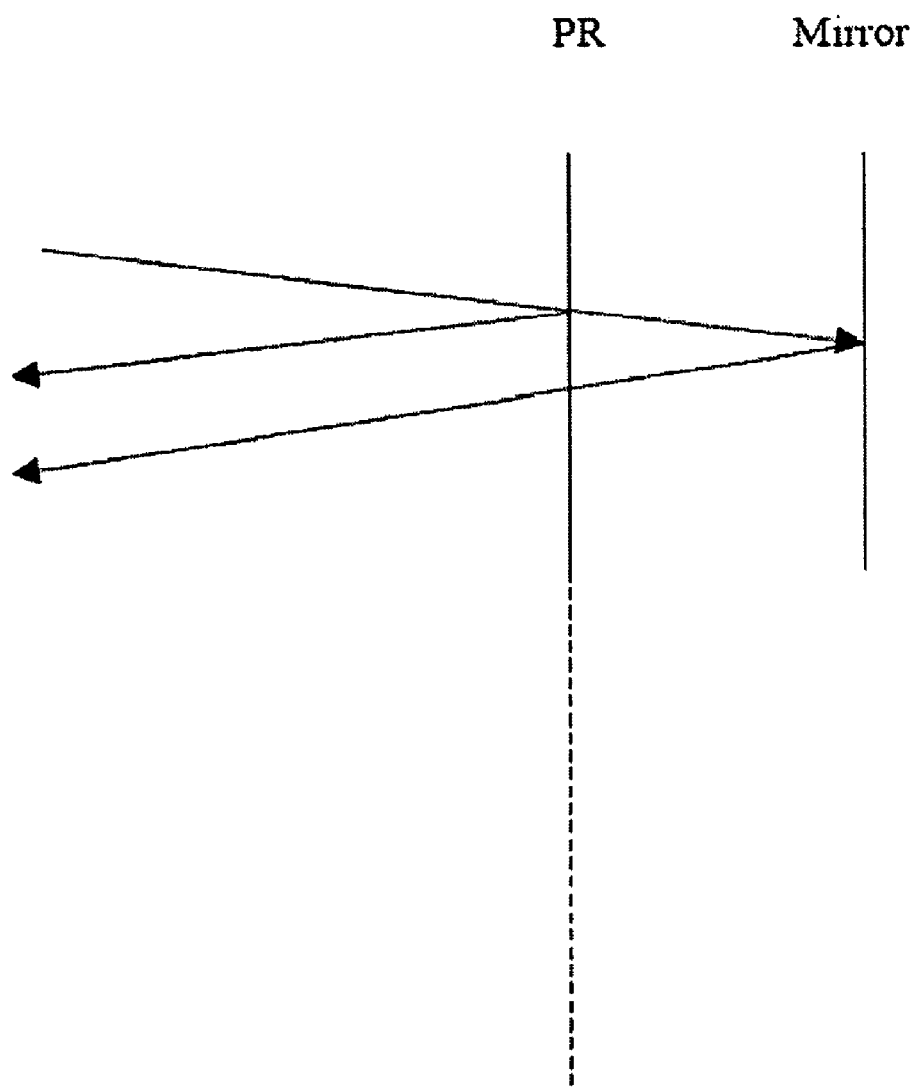
FIG. 2 shows a GT etalon.
Figure 3:
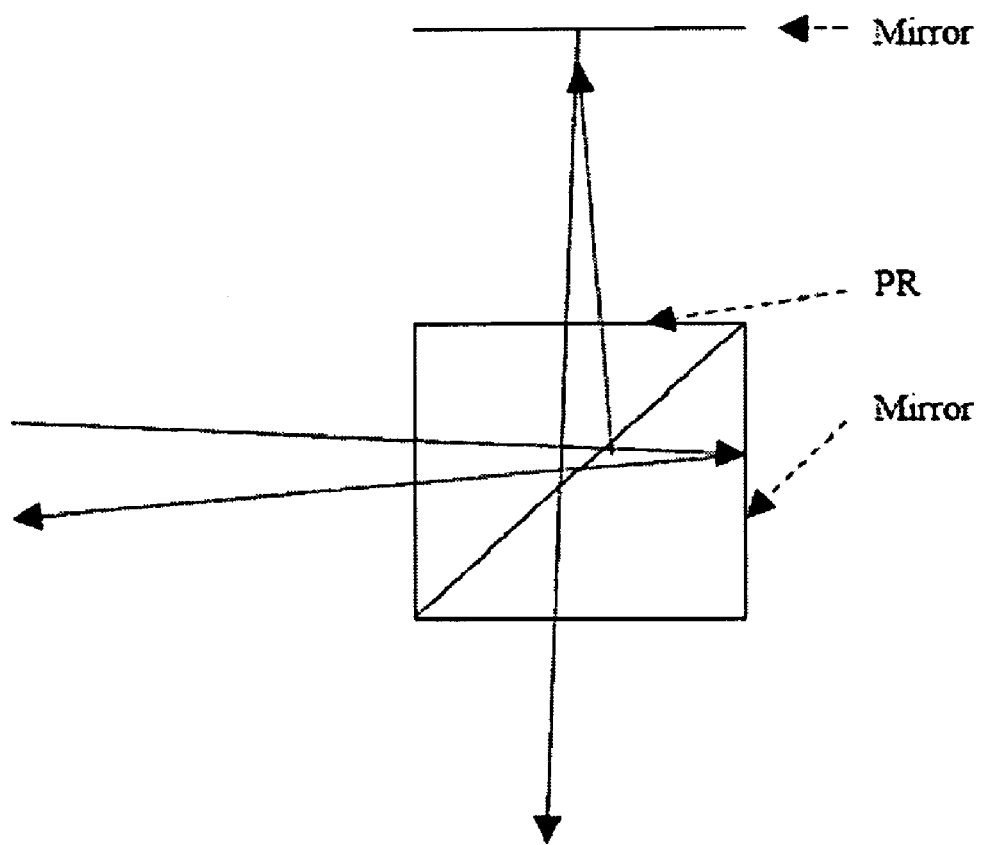
FIG. 3 shows a 2GT-mirror.
Figure 4A:
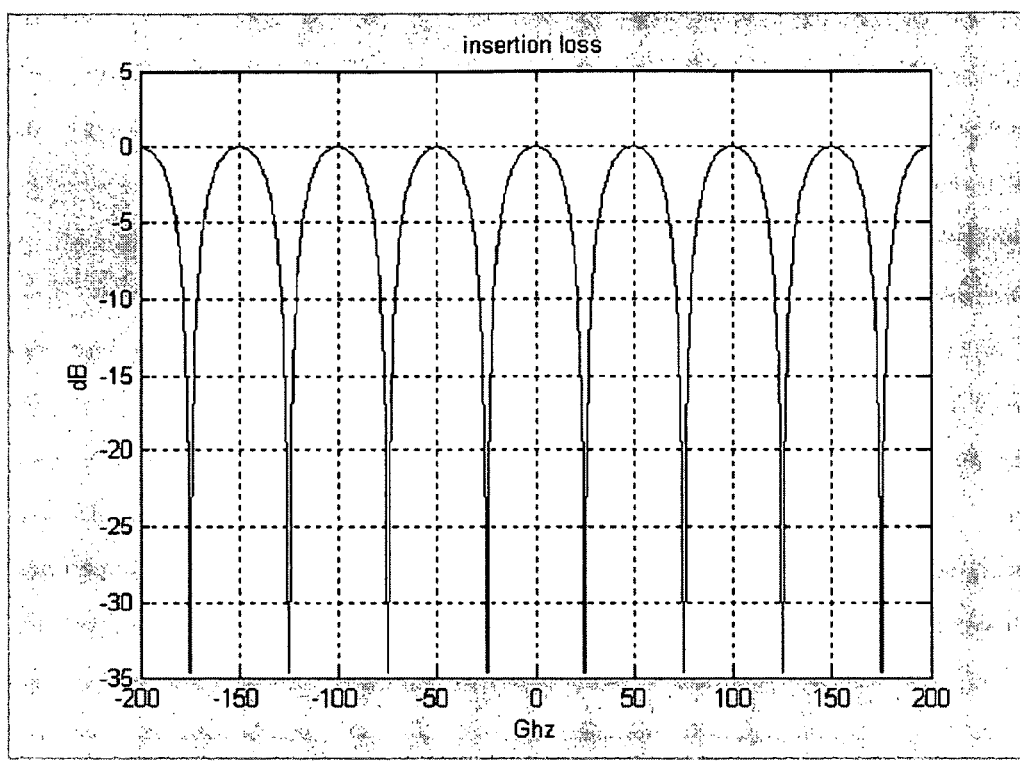
FIG. 4A shows the power spectrum of the design of FIG. 3.
Figure 4B:
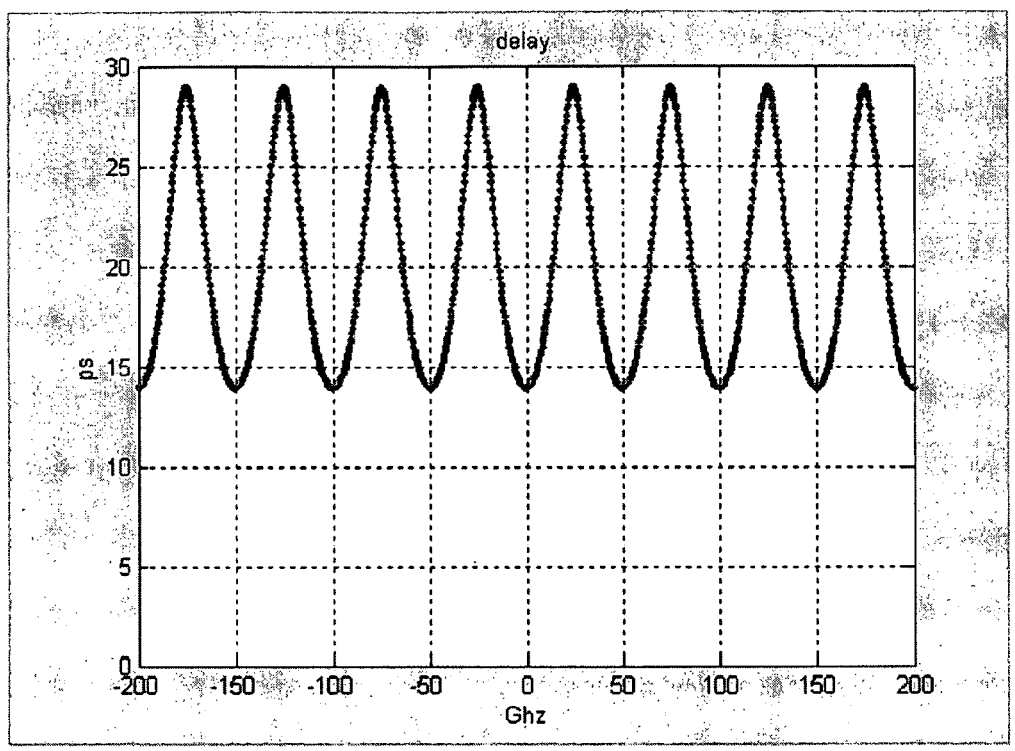
FIG. 4B shows the time delay for the design of FIG. 3, with PR=3.3%.
Figure 5A:
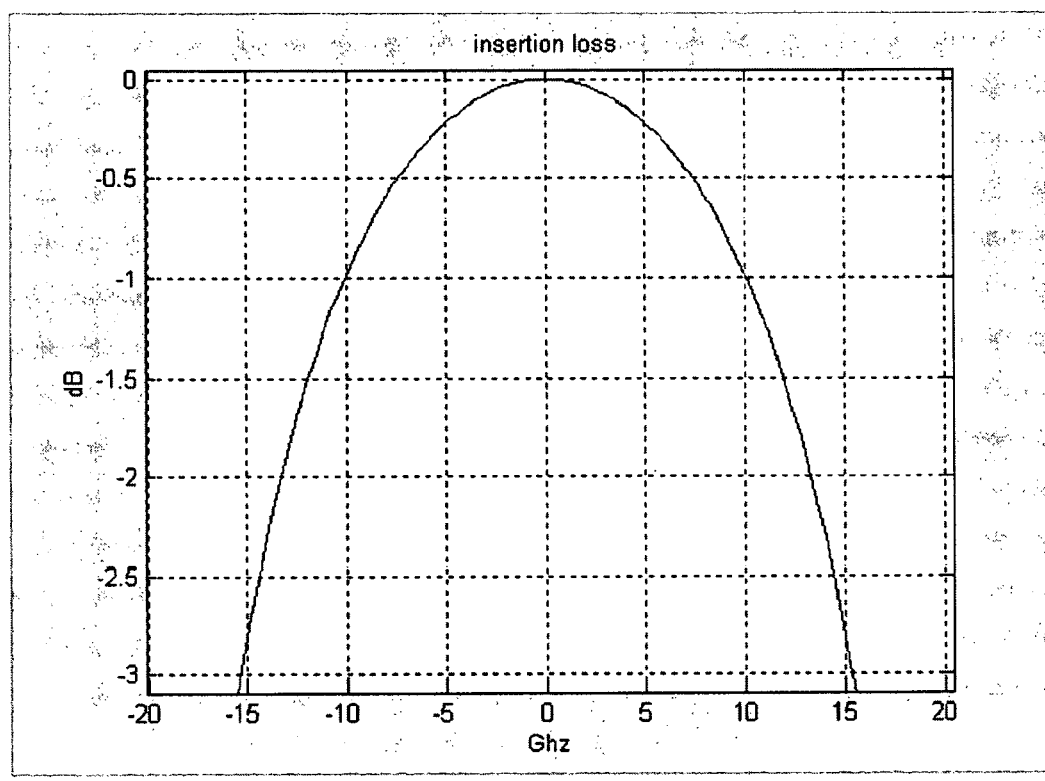
FIGS. 5A and 5B are magnifications of portions of FIGS. 4A and 4B respectively.
Figure 5B:
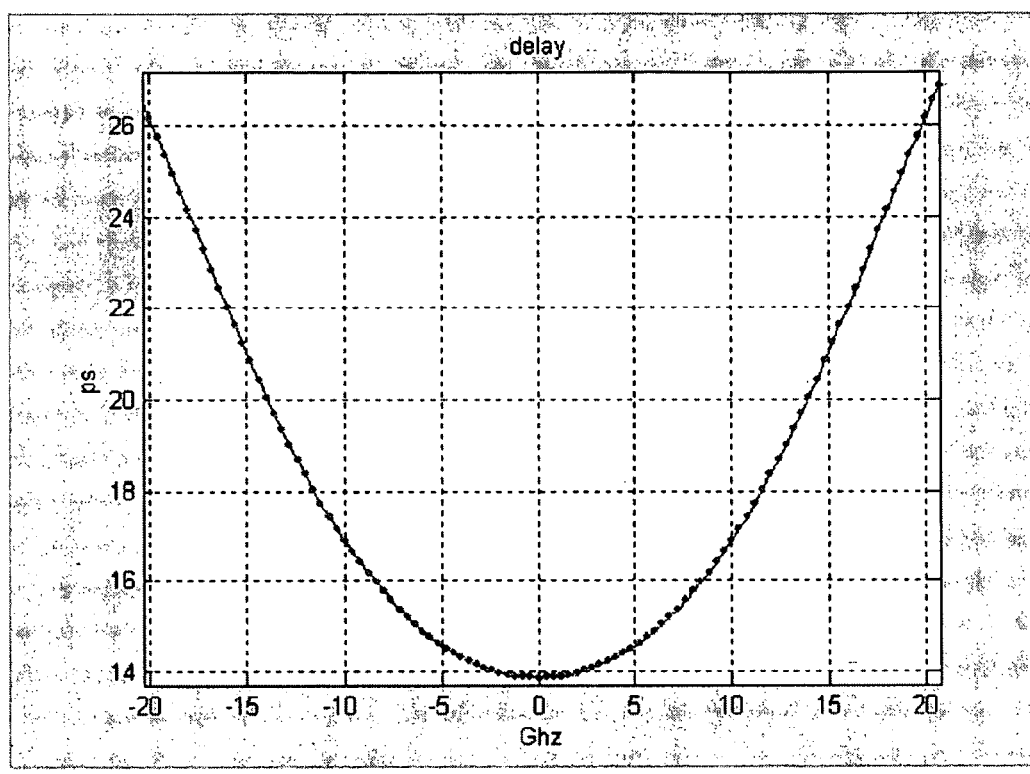
Figure 6:
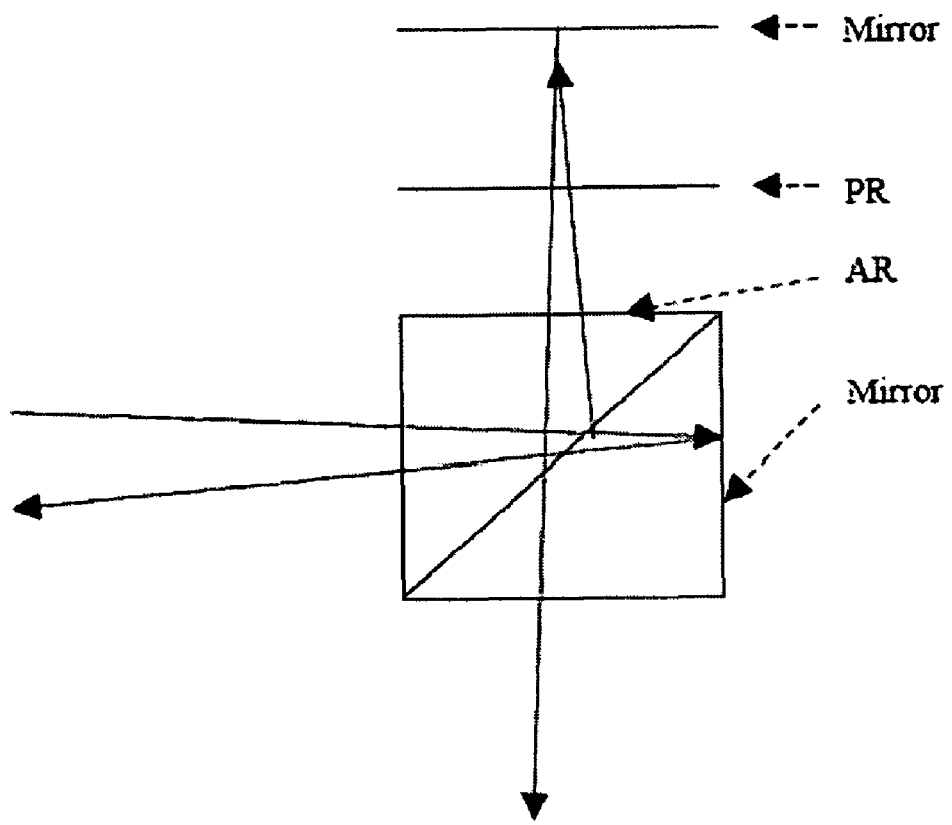
FIG. 6 shows a GT-AP-mirror.
Figure 7A:
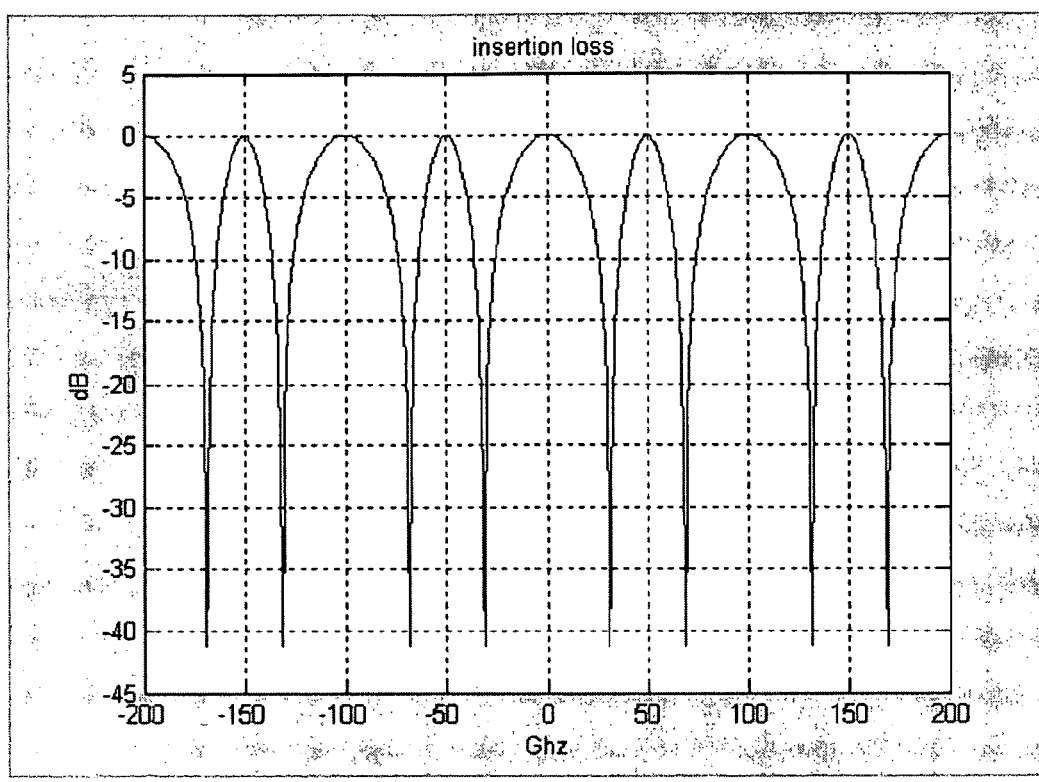
FIG. 7A shows the power spectrum of the design of FIG. 8.
Figure 7B:
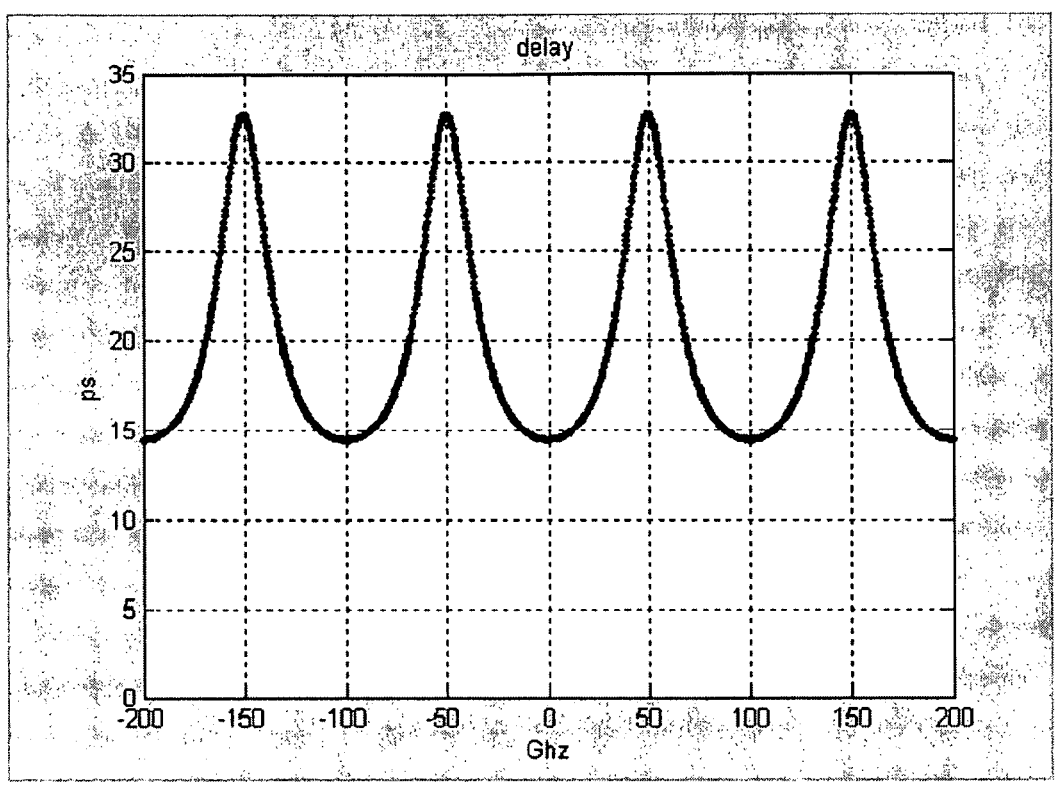
FIG. 7B shows the lime delay for the design of FIG. 6, with PR=15%.
Figure 8A:
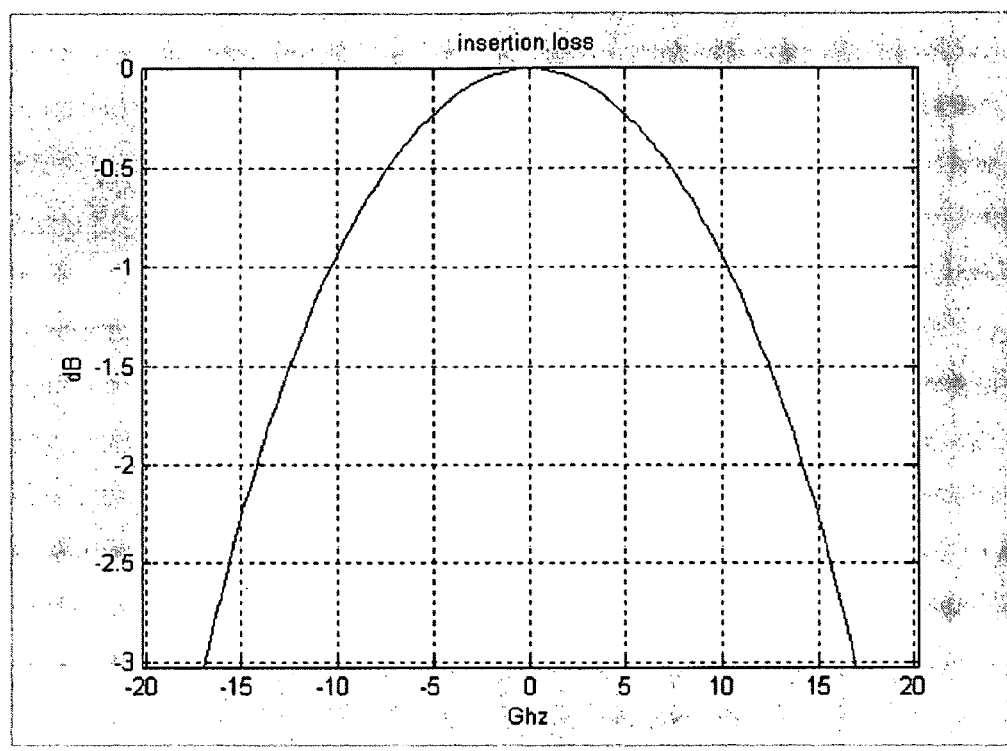
FIGS. 8A and 8B are magnifications of portions of FIGS. 7A and 7B respectively.
Figure 8B:
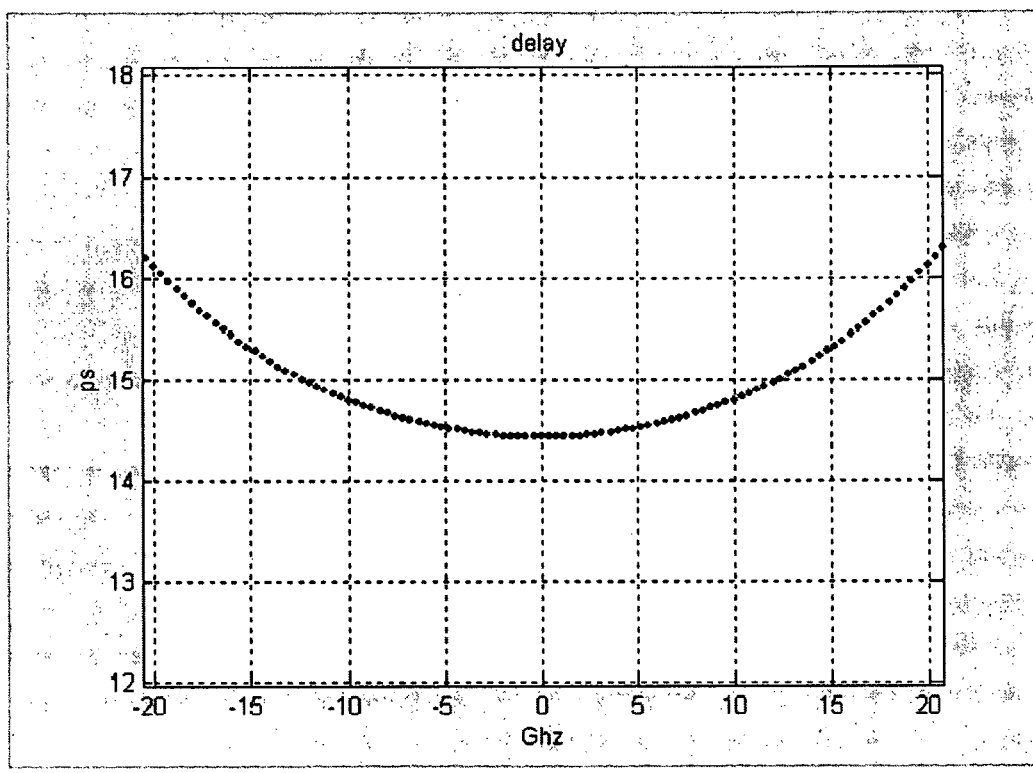
Figure 9:
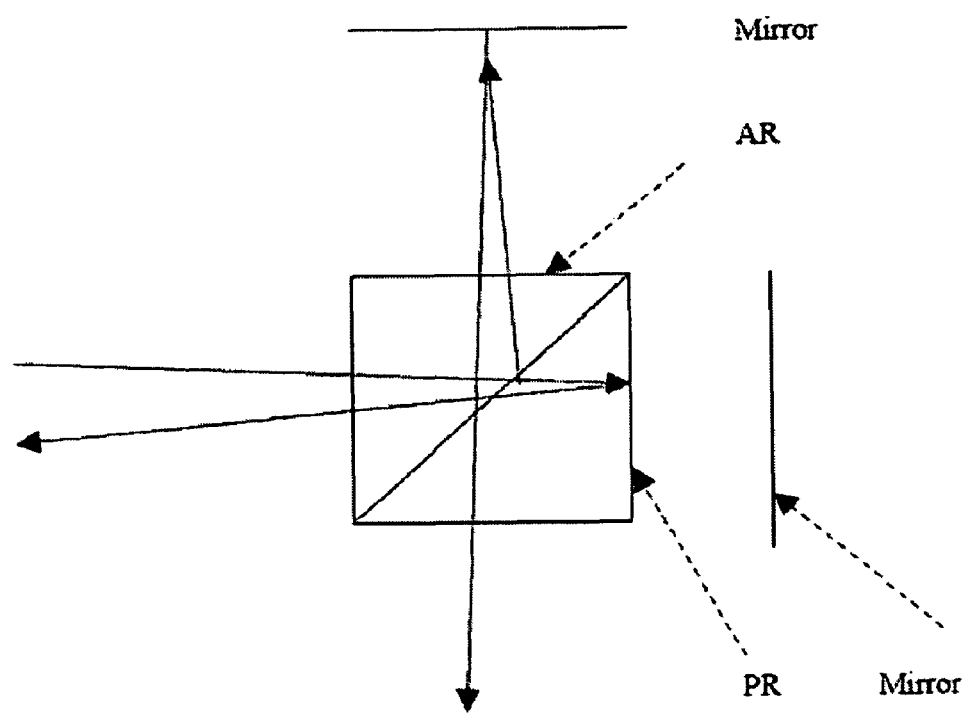
FIG. 9 shows a Mirror-GT.
Figure 10A:
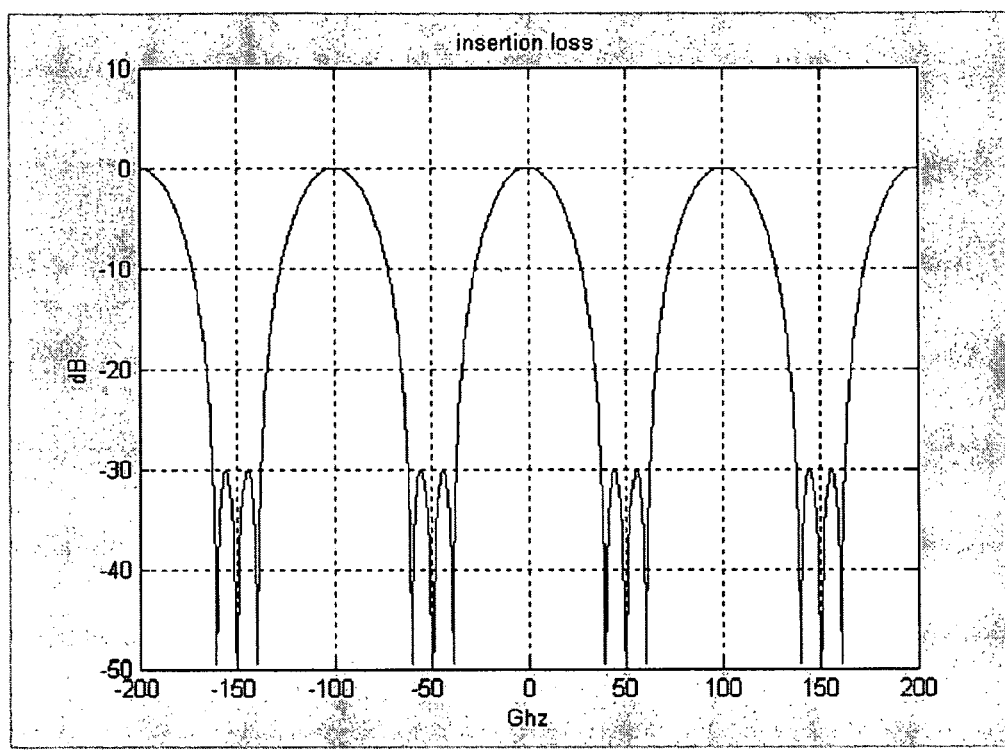
FIG. 10A shows the power spectrum of the design of FIG. 9.
Figure 10B:
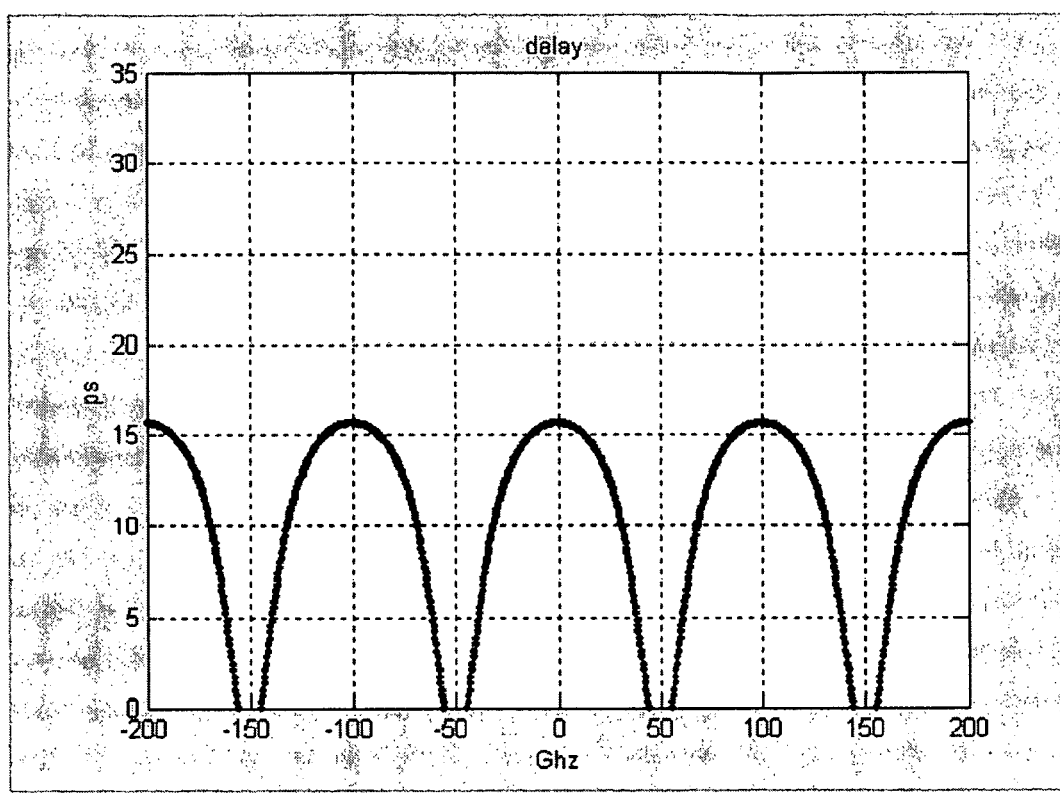
FIG. 10B shows the time delay for the design of FIG. 9, with PR=15%.
Figure 11A:
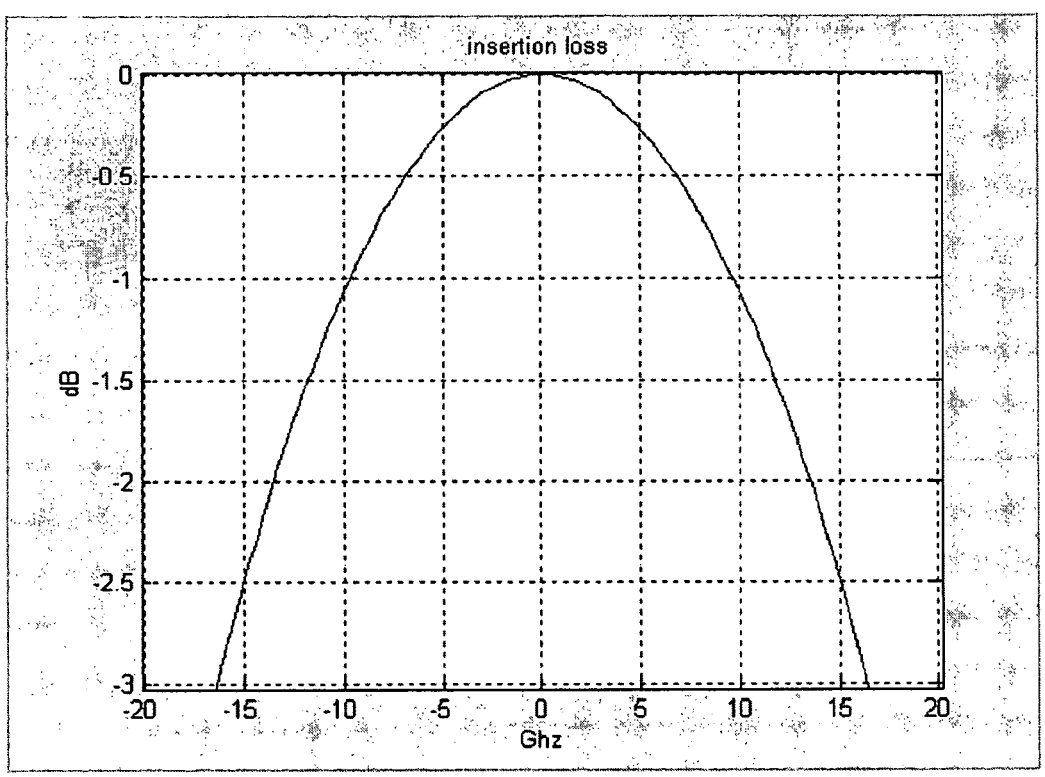
FIGS. 11A and 11B are magnifications of portions of FIGS. 10A and 10B respectively.
Figure 11B:
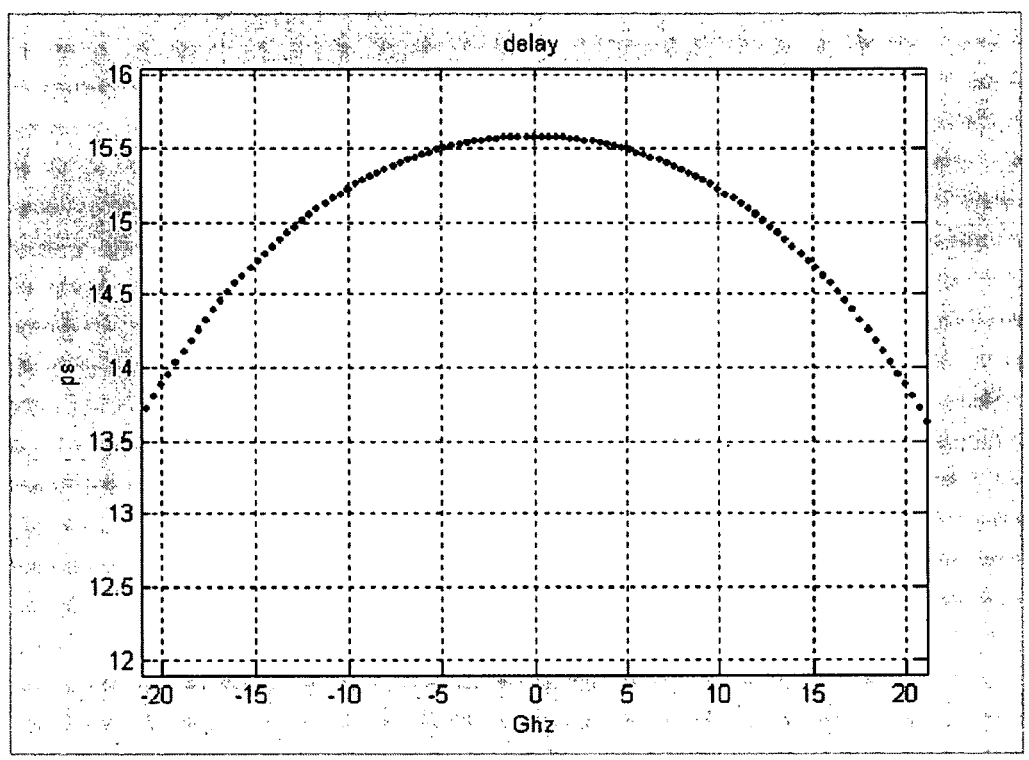
Figure 12:
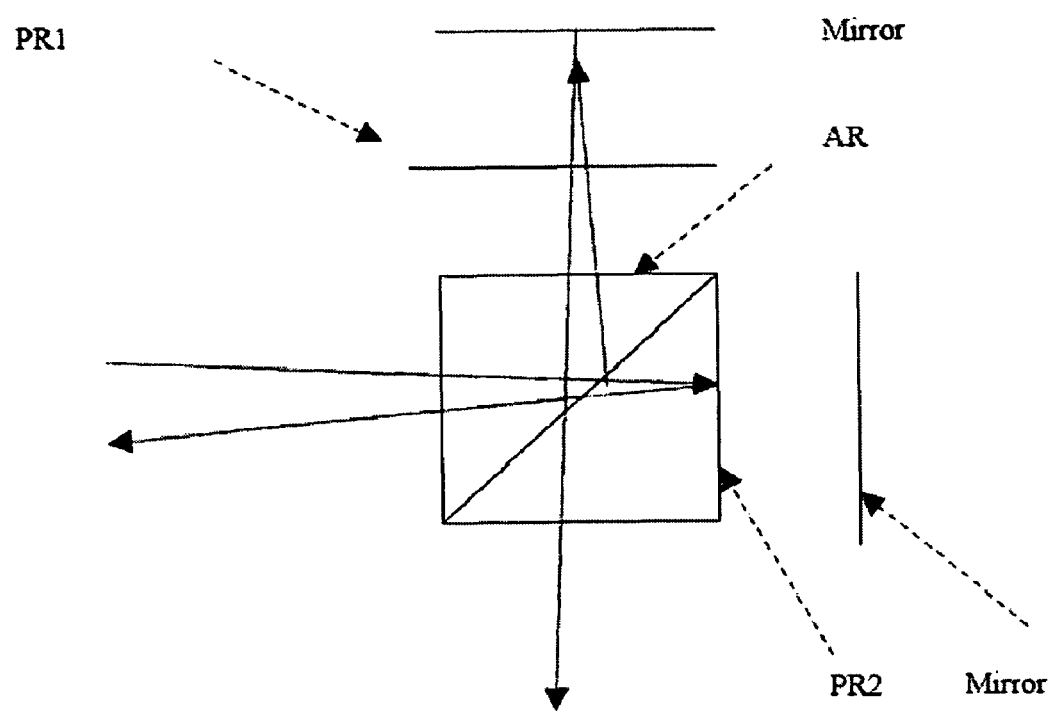
FIG. 12 shows a GT-AP-GT.
Figure 13A:
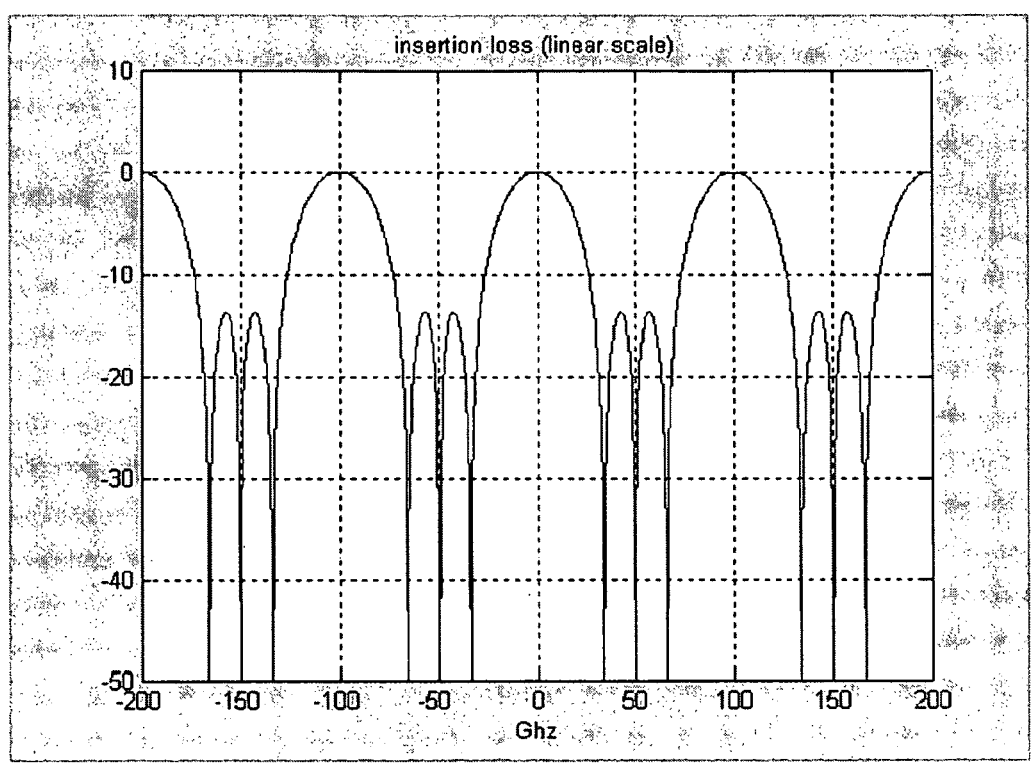
FIG. 13A shows the power spectrum of the design of FIG. 12.
Figure 13B:
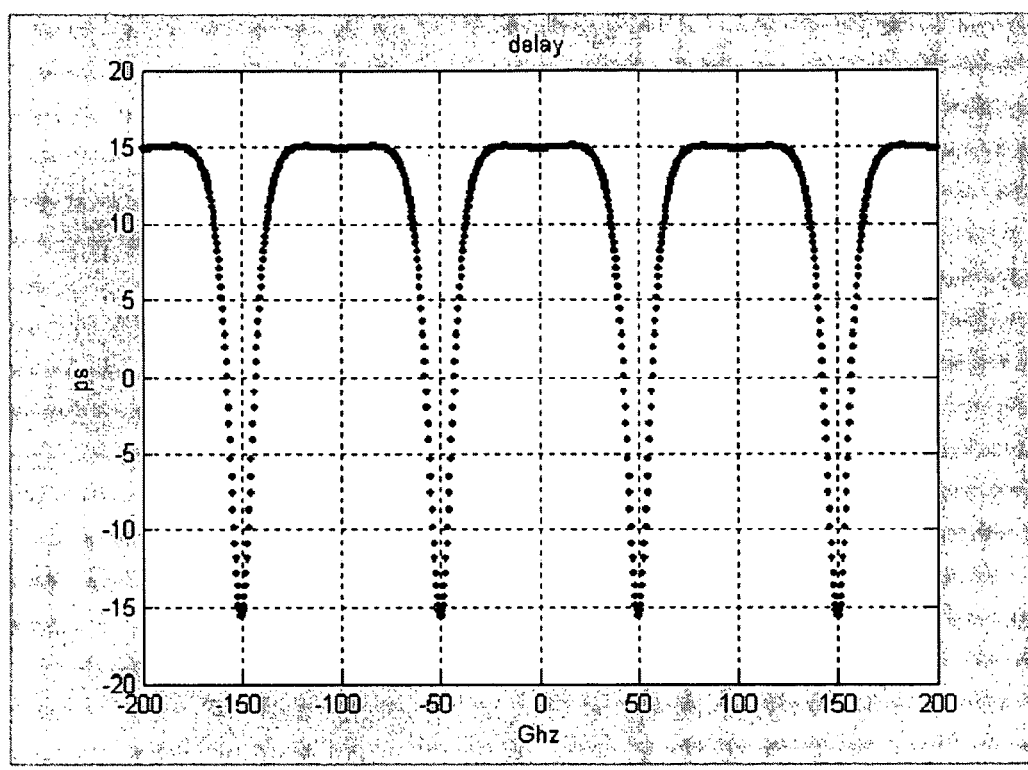
FIG. 13B shows the time delay for the design of FIG. 12, with PR1=2%, PR2=37%.
Figure 14A:
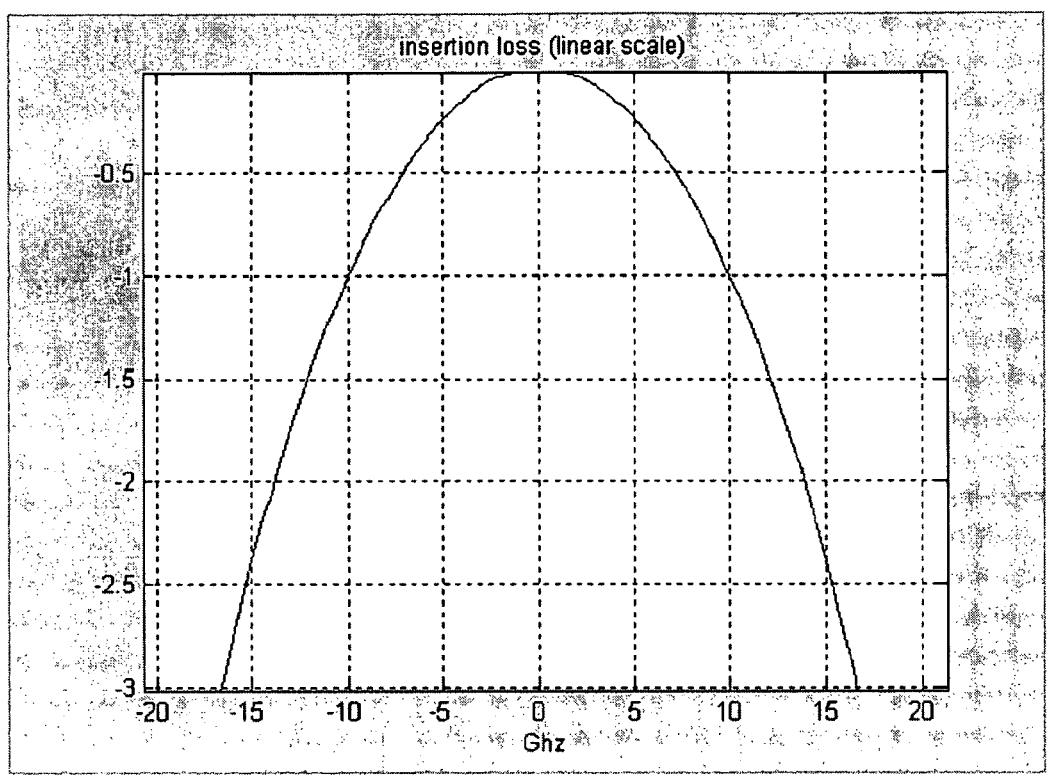
FIGS. 14A and 14B are magnifications of portions of FIGS. 13A and 13B respectively.
Figure 14B:
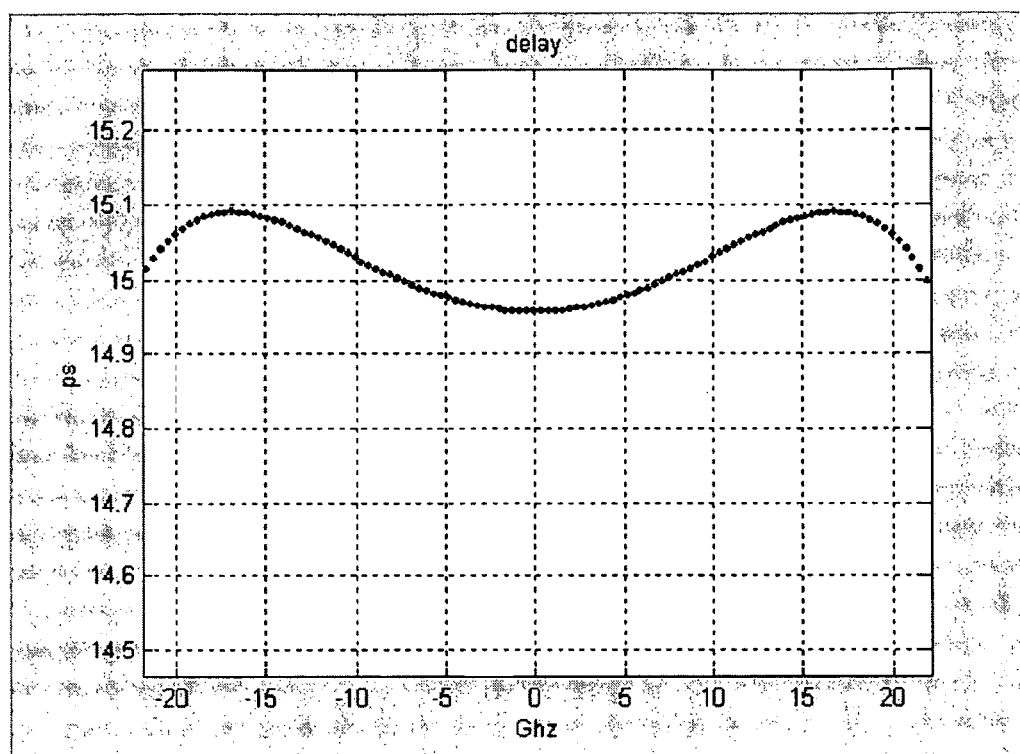
Figure 15:
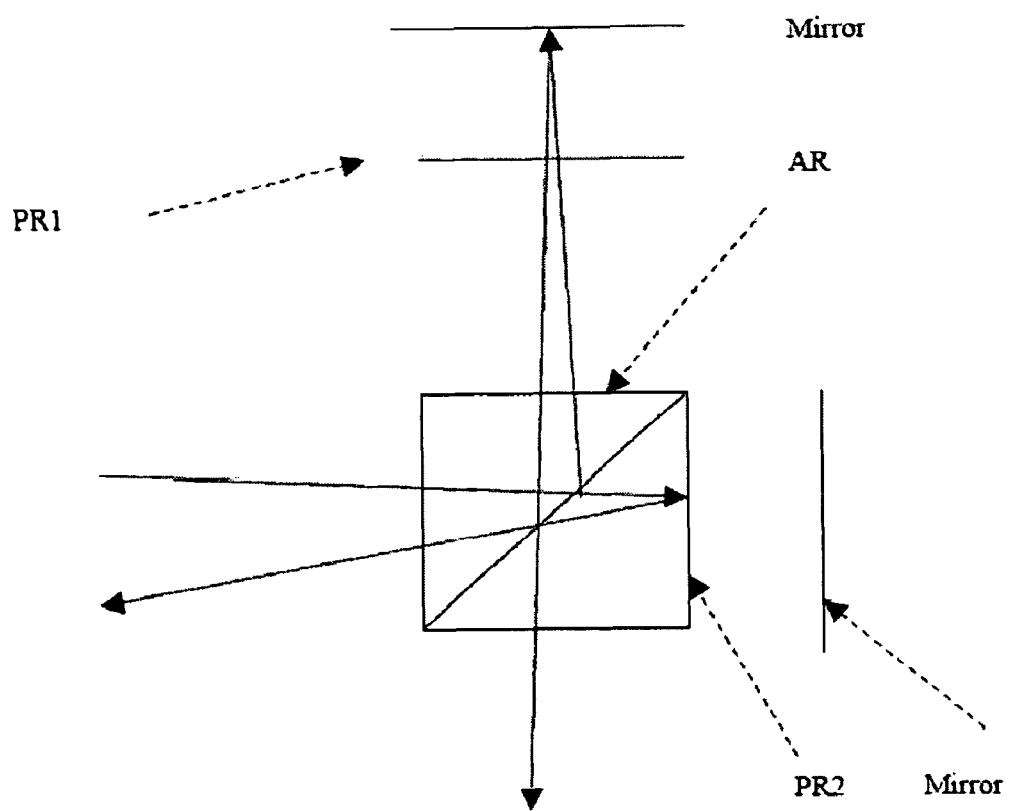
FIG. 15 shows a GT-2AP-GT.
Figure 16A:
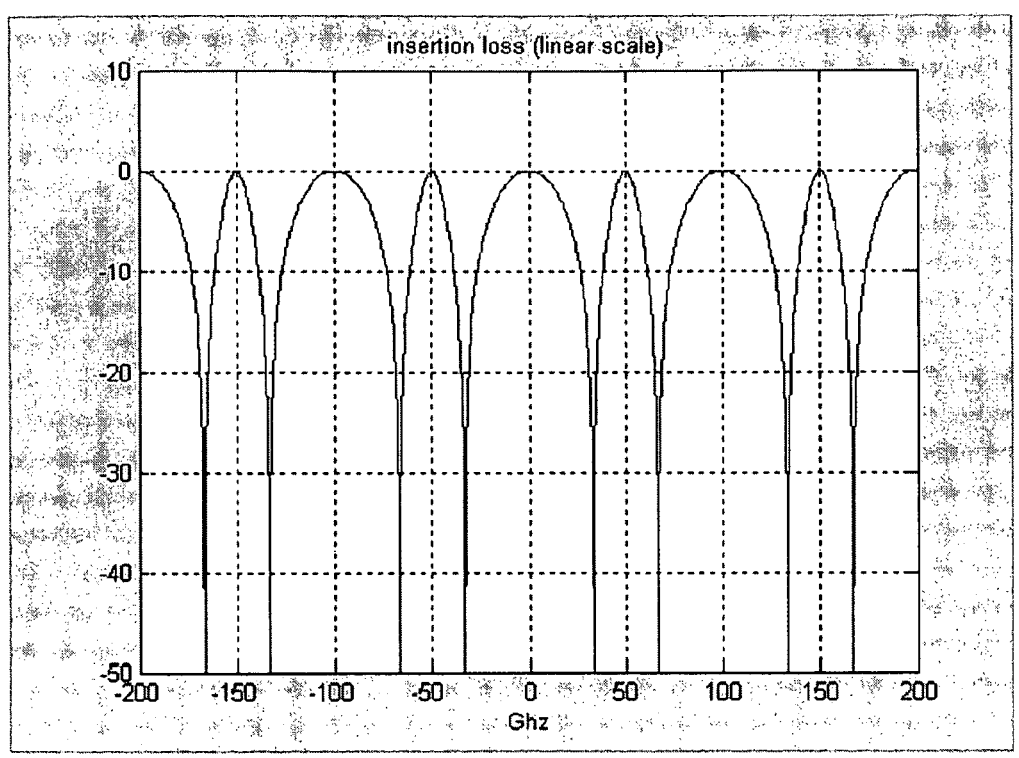
FIG. 16A shows the power spectrum of the design of FIG. 15.
Figure 16B:
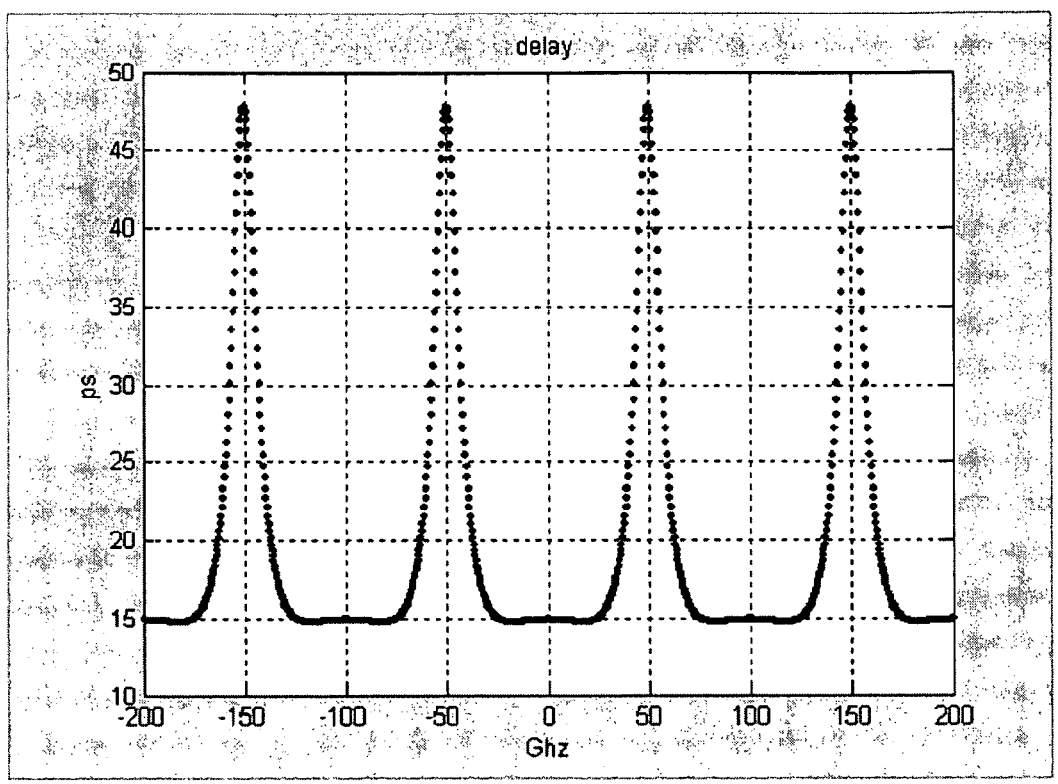
FIG. 16B shows the time delay for the design of FIG. 15, with PR1=37%, PR2=2%.
Figure 17A:
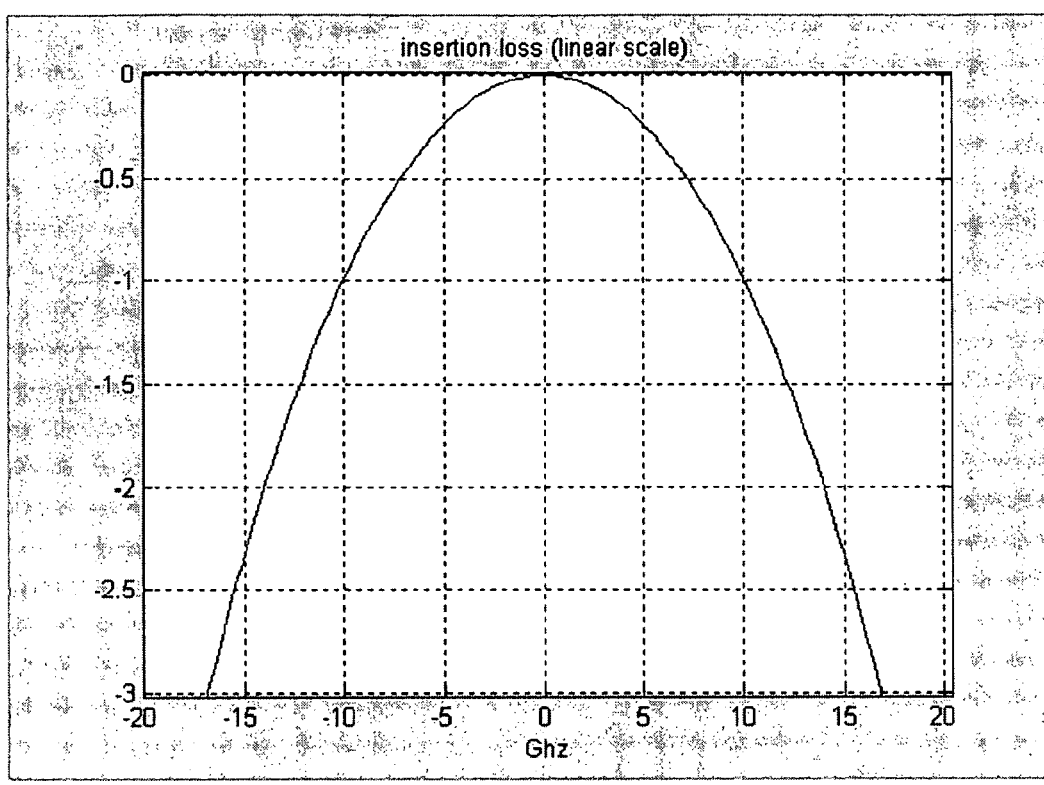
Figure 17B:
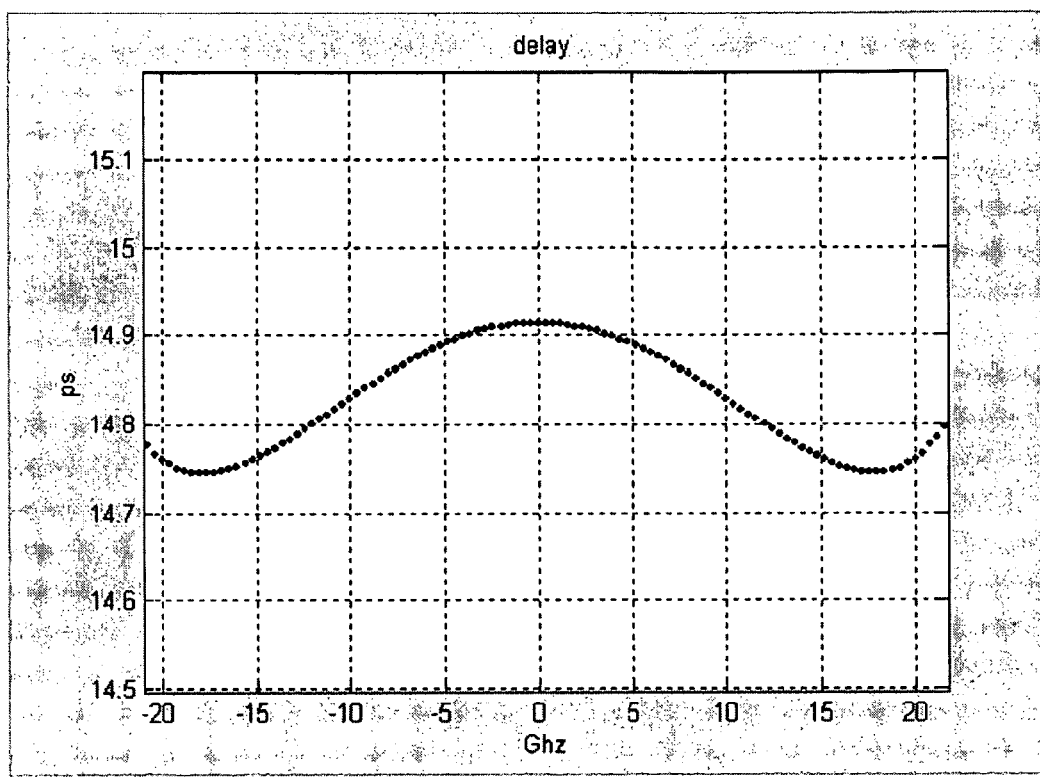

FIG. 1 shows a Michelson DLI. FIG. 2 shows a GT etalon. FIG. 3 shows a 2GT-mirror. FIG. 4A shows the power spectrum of the design of FIG. 3 where the top face of the beamsplitter has a partially reflecting (PR) coating. FIG. 4B shows the time delay for the design of FIG. 3, with PR=3.3%. FIGS. 5A and 5B are magnifications of portions of FIGS. 4A and 4B respectively. FIG. 6 shows a GT-AP-mirror. FIG. 7A shows the power spectrum of the design of FIG. 8. FIG. 7B shows the time delay for the design of FIG. 6, with PR=15%. FIGS. 8A and 8B are magnifications of portions of FIGS. 7A and 7B respectively. FIG. 9 shows a Mirror-GT. FIG. 10A shows the power spectrum of the design of FIG. 9. FIG. 10B shows the time delay for the design of FIG. 9, with PR=15%. FIGS. 11A and 11B are magnifications of portions of FIGS. 10A and 10B respectively. FIG. 12 shows a GT-AP-GT. FIG. 13A shows the power spectrum of the design of FIG. 12. FIG. 13B shows the time delay for the design of FIG. 12, with PR1=2%, PR2=37%. FIGS. 14A and 14B are magnifications of portions of FIGS. 13A and 13B respectively. FIG. 15 shows a GT-2AP-GT. FIG. 16A shows the power spectrum of the design of FIG. 15. FIG. 16B shows the time delay for the design of FIG. 15, with PR1=37%, PR2=2%. FIGS. 17A and 17B are magnifications of portions of FIGS. 16A and 16B respectively.

Therefore, the present invention replaces a reflection mirror of the DLI with an etalon. The etalon can be GT-etalon, FP etalon or other types of etalon. The etalon provides a non-integer multiple of etalon time constant, time delay and the amount of delay can be adjusted by varying the reflectivity of the two surfaces on the etalon.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. A DPSK demodulator comprising two interference arms and including at least one etalon in at least one of said arms to set a desired time delay between said two interference arms;
   wherein said at least one etalon in at least one of said arms comprises an etalon in both said arms; and
   wherein each said etalon comprises about the same FSR.

2. The DPSK demodulator of claim 1, wherein said FSR is about equal to an ITU frequency spacing.

3. The DPSK demodulator of claim 1, wherein said time delay is about constant within the pass band of the channel.

4. The DPSK demodulator of claim 1, wherein a surface of said etalon comprises a coating that that is selected to determine a desired time delay.

5. A method comprising the steps of:
providing a DPSK demodulator having two interference arms; and
setting a desired time delay between said two interference arms by placing at least one etalon in at least one of said arms;
wherein said at least one etalon in at least one of said arms comprises an etalon in both said arms; and
wherein each said etalon comprises about the same FSR.

6. The method of claim 5, wherein said FSR is about equal to an ITU frequency spacing.

7. The method of claim 5, wherein said time delay is about constant within the pass band of the channel.

8. The method of claim 5, further comprising selecting a coating for a surface of said etalon to determine said desired time delay.

* * * * *